United States Patent
Biran et al.

(10) Patent No.: US 7,924,848 B2
(45) Date of Patent: *Apr. 12, 2011

(54) RECEIVE FLOW IN A NETWORK ACCELERATION ARCHITECTURE

(75) Inventors: Giora Biran, Zichron Yaakov (IL);
Zorik Machulsky, Gesher HaZiv (IL);
Vadim Makhervaks, Austin, TX (US);
Renato John Recio, Austin, TX (US);
Julian Satran, Atlit (IL); Leah Shalev,
Zichron Yaakov (IL); Ilan Shimony,
Haifa (IL)

(73) Assignee: International Business Machines Corporation, Armonk, NY (US)

(*) Notice: Subject to any disclaimer, the term of this patent is extended or adjusted under 35 U.S.C. 154(b) by 971 days.

This patent is subject to a terminal disclaimer.

(21) Appl. No.: 11/132,101

(22) Filed: May 18, 2005

(65) Prior Publication Data
US 2006/0262797 A1 Nov. 23, 2006

(51) Int. Cl.
*H04L 12/28* (2006.01)
*G06F 15/16* (2006.01)
*G06F 15/167* (2006.01)

(52) U.S. Cl. ............... 370/395.52; 370/412; 709/212; 709/250

(58) Field of Classification Search ............ 370/392
See application file for complete search history.

(56) References Cited

U.S. PATENT DOCUMENTS

| | | | |
|---|---|---|---|
| 6,434,620 B1 | 8/2002 | Boucher et al. | |
| 7,647,436 B1* | 1/2010 | Westrelin et al. | 710/33 |
| 2003/0177391 A1* | 9/2003 | Ofek et al. | 713/201 |
| 2004/0042483 A1* | 3/2004 | Elzur et al. | 370/463 |
| 2004/0049601 A1* | 3/2004 | Boyd et al. | 709/250 |
| 2004/0062267 A1* | 4/2004 | Minami et al. | 370/463 |
| 2004/0073703 A1 | 4/2004 | Boucher et al. | |
| 2004/0148376 A1 | 7/2004 | Rangan et al. | |
| 2004/0177243 A1* | 9/2004 | Worley, Jr. | 713/2 |
| 2005/0204058 A1* | 9/2005 | Philbrick et al. | 709/238 |
| 2005/0246443 A1* | 11/2005 | Yao et al. | 709/227 |
| 2006/0059256 A1* | 3/2006 | Kakani | 709/224 |
| 2006/0104308 A1* | 5/2006 | Pinkerton et al. | 370/469 |

FOREIGN PATENT DOCUMENTS

WO WO 2004/021628 * 3/2004

OTHER PUBLICATIONS

Regnier, Greg et al., "ETA: Experience with an Intel Xeon Processor as a Packet Processing Engine", Micro, IEEE, Publication Date: Jan.-Feb. 2004, vol. 24, Issue 1, pp. 24-31.

* cited by examiner

*Primary Examiner* — Daniel J Ryman
*Assistant Examiner* — John Blanton

(57) ABSTRACT

A method for receiving data in a network acceleration architecture for use with TCP (transport control protocol), iSCSI (Internet Small Computer System Interface) and RDMA (Remote Direct Memory Access) over TCP, including providing a hardware acceleration engine, called a streamer, adapted for communication with and processing data from a consumer application in a system that supports TCP, iSCSI and RDMA over TCP, providing a software protocol processor adapted for carrying out TCP implementation, the software control processor being called a TCE (TCP Control Engine), wherein the streamer and the TCE are adapted to operate asynchronously and independently of one another, and receiving an inbound TCP segment with the streamer.

17 Claims, 3 Drawing Sheets

RECEIVE FLOW IN A NETWORK ACCELERATION ARCHITECTURE

FIELD OF THE INVENTION

The present invention relates generally to network acceleration, and more particularly to a network acceleration architecture which allows efficient iSCSI (Internet Small Computer System Interface) and RDMA (Remote Direct Memory Access) acceleration, preserves flexibility of TCP (transport control protocol) implementation, and adapts to increasing main CPU (central processing unit) speed, memory bandwidth and latency.

BACKGROUND OF THE INVENTION

RDMA is a technique for efficient movement of data over high-speed transports. RDMA enables a computer to directly place information in another computer's memory with minimal demands on memory bus bandwidth and CPU processing overhead, while preserving memory protection semantics. RNIC is a Network Interface Card that provides RDMA services to the consumer. The RNIC may provide support for RDMA over TCP.

RNIC can serve as an iSCSI target or initiator adapter. "Initiator" refers to a SCSI command requester (e.g., host), and "target" refers to a SCSI command responder (e.g., I/O device, such as SCSI drives carrier, tape).

Much work has been done to create efficient, scalable and flexible RDMA and iSCSI acceleration solutions, but a successful solution is not trivial. One challenge is that all data processing operations must be handled efficiently, while at the same time, the protocol implementation must be flexible. The need for flexibility in protocol implementation is particularly important for TCP, which constantly evolves, attempting to adapt TCP behavior to changing network speed, traffic pattern and a network infrastructure. Another challenge is the ability to adapt to increases in main CPU speed, main memory bandwidth and latency.

One example of a prior art solution, which uses RNICs for network acceleration, is that of embedded processors that handle protocol processing. One or more embedded CPUs are tightly coupled with the data path, and touch each incoming and generated packet. There are different hardware acceleration engines surrounding such embedded CPUs, which assist in different data processing operations. Such a solution is generally limited by the embedded CPU capabilities, which typically lag behind the main CPU technology for several generations. This limits the performance benefits and lifetime of such solutions. Latency is relatively high, since before the packet is generated to the network or placed to the memory, it has to be processed by one or more CPUs. To reach high networking rates, multiple CPUs need to be placed on the data path and perform simultaneous handling of multiple packets. This adds additional latency, makes implementation difficult and increases the cost of the overall solution.

Another prior art solution is a state machine implementation. However, this lacks flexibility in protocol processing, which as mentioned previously, is particularly important in TCP.

SUMMARY OF THE INVENTION

The present invention seeks to provide an improved TCP, RDMA and iSCSI network acceleration architecture, as is described more in detail hereinbelow.

In accordance with a non-limiting embodiment of the invention, heavy data intensive operations are separated from the protocol control. Data processing may include "fast path" execution (defined in the description below) performed by a dedicated hardware acceleration engine, whereas the protocol control operations may be carried out by software. The split of functions between software and hardware is done in such way that allows asynchronous and independent operation of the data processing (hardware) and the protocol control (software). There is a "loose" coupling of the software and hardware components. The invention preserves flexibility in protocol implementation and is capable of sustaining protocol modification, without sacrificing performance and efficiency.

In accordance with a non-limiting embodiment of the invention, a hardware acceleration engine, called a streamer, may communicate with and process data from a consumer application. The streamer may receive inbound TCP segments. A software protocol processor, called a TCE (TCP Control Engine), may carry out TCP implementation. The streamer and the TCE may operate asynchronously and independently of one another.

BRIEF DESCRIPTION OF THE DRAWINGS

The present invention will be understood and appreciated more fully from the following detailed description taken in conjunction with the appended drawings in which.

DETAILED DESCRIPTION OF EMBODIMENTS

Figure 1:
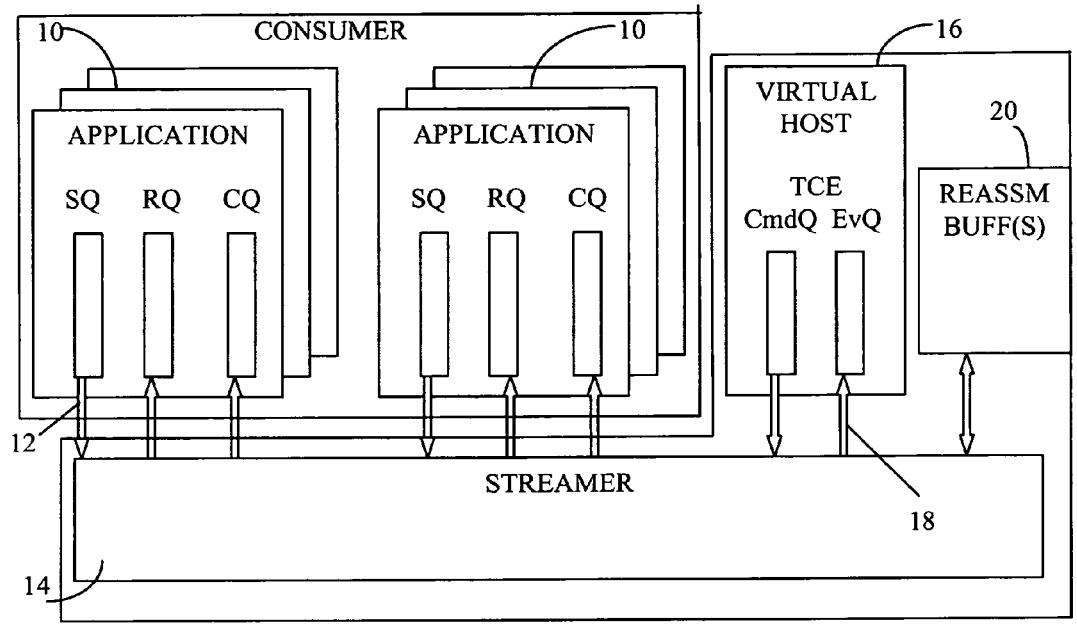
FIG. 1 is a simplified block diagram of a network acceleration architecture in accordance with an embodiment of the present invention.

Reference is now made to FIG. 1, which illustrates a network acceleration architecture in accordance with an embodiment of the present invention.

The network acceleration architecture may include consumer applications 10, which may run on a main CPU complex. The consumer applications 10 may use asynchronous queue based interface(s) 12 to submit work requests to a hardware acceleration engine 14, also referred to as a streamer 14. The interface(s) 12 may be in accordance with the RDMA verb specification.

As is known in the art, RDMA uses an operating system programming interface, referred to as "verbs", to place work requests (WRs) onto a work queue. In brief, queue pairs may be used to transfer messages to the streamer 14 (e.g., memory regions in the streamer 14). Each queue pair may include a send work queue (SQ) and a receive work queue (RQ). For example, the consumer application 10 may generate work requests, which are placed onto a work queue as work queue elements (WQEs). Accordingly, the send work queue may include WQEs that describe data to be transmitted to the streamer 14, and the receive work queue may include WQEs that describe where to place incoming data from the streamer 14. A completion queue may include completion queue elements (CQEs) that contain information about previously completed work queue elements. A completion queue element is a data structure on a completion queue that contains sufficient information to determine the queue pair and specific work queue element that has been completed.

The interface(s) 12 may enable using iSCSI and socket acceleration mechanisms provided by the streamer 14. For example, the streamer 14 may be implemented as an RNIC, which as mentioned above, may provide support for RDMA over TCP and may serve as an iSCSI target or initiator adapter. The RNIC can also provide iSER ("iSCSI Extensions for RDMA") services. iSER is an extension of the data transfer model of iSCSI, which enables the iSCSI protocol to take advantage of the direct data placement technology of the RDMA protocol. iSCSI protocol exchanges iSCSI Protocol Data Units (PDUs) to execute SCSI commands provided by the SCSI layer. The iSER data transfer protocol may slightly change or adapt iSCSI implementation over RDMA; e.g., it eliminates such iSCSI PDUs as DataOut and DataIn, and instead uses RDMA Read and RDMA Write messages. Basically iSER presents iSCSI-like capabilities to the upper layers, but the protocol of data movement and wire protocol is different.

In short, iSCSI uses regular TCP connections, whereas iSER implements iSCSI over RDMA. iSER uses RDMA connections and takes advantage of different RDMA capabilities to achieve better recovery capabilities, improve latency and performance. Since RNIC supports both iSCSI and iSER services, it enables SCSI communication with devices that support different levels of iSCSI implementation. Protocol selection (iSCSI vs. iSER) is carried out on the iSCSI login phase.

The hardware acceleration engine 14 cooperates with a software protocol processor 16, also referred to as a TCP Control Engine (TCE) 16, to provide network acceleration semantics to consumer applications 10. The hardware acceleration engine 14 is responsible to handle all data intensive operations, as described in more detail hereinbelow.

TCE 16 is a software component that implements a protocol processing part of the network acceleration solution. This software component implements the decision making part of the TCP protocol. For example, without limitation, TCE 16 may run on a main CPU, dedicated CPU, or on a dedicated virtual host (partition). Streamer 14 and TCE 16 may use an asynchronous dual-queue interface 18 to exchange information between software and hardware parts of solution. The dual-queue interface 18 may include two unidirectional queues. A command queue (CmdQ) may be used to pass information from the TCE 16 to the streamer 14. An event queue (EvQ) may be used to pass information from the streamer 14 to the TCE 16. Streamer 14 and TCE 16 may work asynchronously without any need to serialize and/or synchronize operations between them. The architecture does not put restrictions or make assumptions regarding the processing/interface latency between the hardware acceleration engine 14 and the software protocol processor 16.

Figure 2:
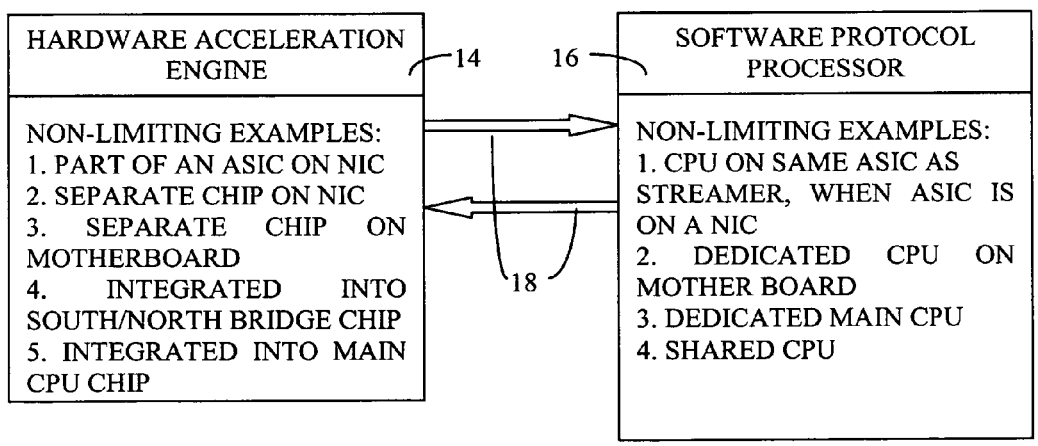
FIG. 2 is a simplified block diagram of different configurations for the streamer and TCE of the network acceleration architecture of FIG. 1.

As seen in FIG. 2, such an architecture allows a wide range of different configurations. For example, without limitation, the hardware acceleration engine 14 can be implemented in an ASIC (application specific integrated circuit), a NIC (network interface card), a chip on a mother board, a PCI (peripheral component interconnect) bus controller chipset, south/north bridges, or be integrated in the CPU. The software protocol processor 16, without limitation, can run on an embedded CPU on the NIC, a dedicated special purpose CPU on the mother board, a dedicated general-purpose main CPU (e.g., in a multi-CPU system), or share the same CPU with applications running on a dedicated virtual host or partition. The invention allows any type of interconnect between the streamer 14 and TCE 16.

Figure 3:
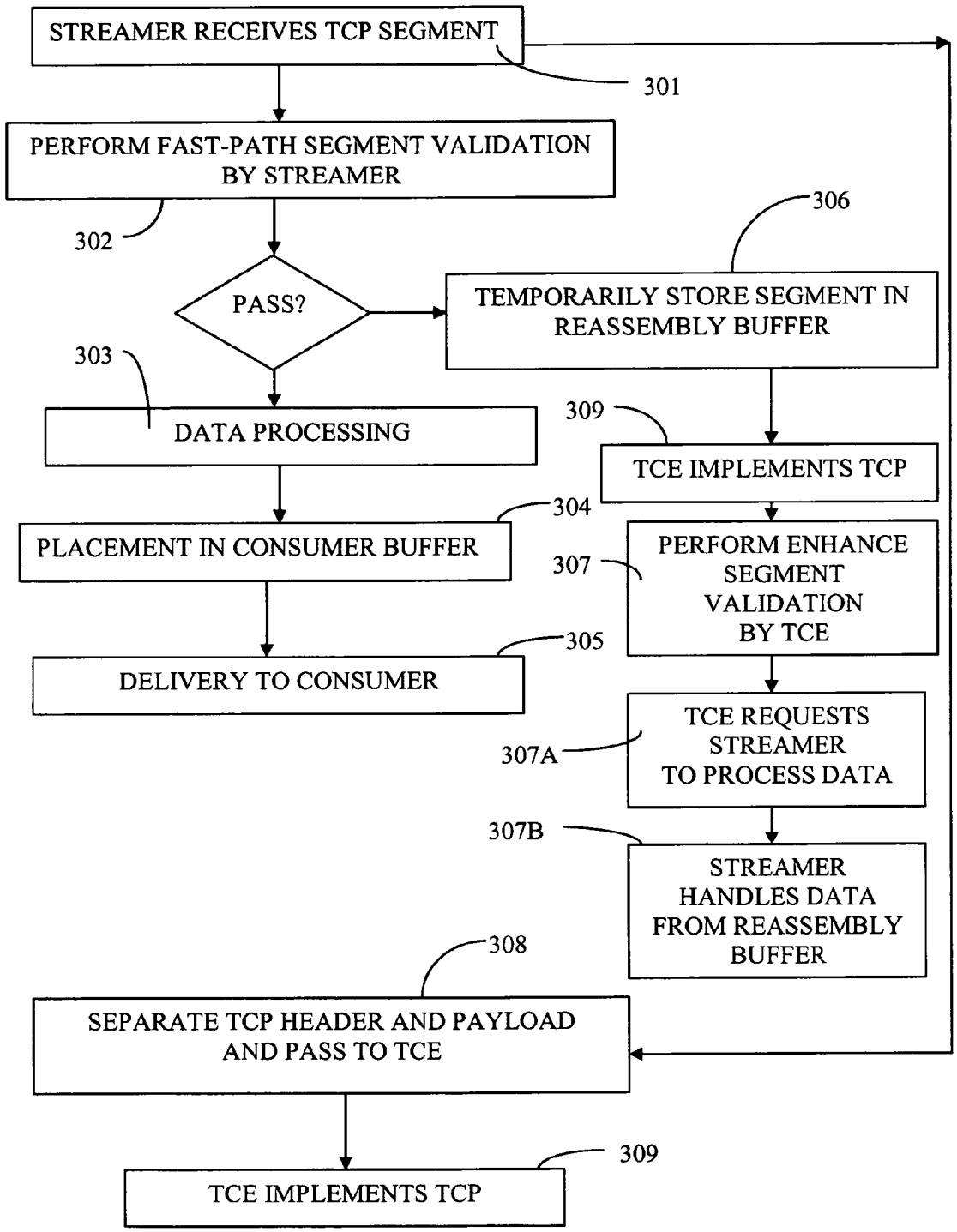
FIG. 3 is a simplified flow chart of receive flow in the network acceleration architecture, in accordance with an embodiment of the present invention.

Reference is now made to FIG. 3, which illustrates a non-limiting embodiment of receive flow in a network acceleration architecture, in accordance with the present invention.

As mentioned above, in the network acceleration architecture of the present invention, the data intensive operations are separated from the complex TCP protocol processing.

In simplistic terms, receiving and processing a TCP segment may be split into three parts:
1. Fast-path segment validation
2. Enhanced segment validation
3. Implementation of TCP protocol First, the streamer 14 receives an inbound TCP segment (step 301). The streamer 14 may perform basic validation and classification of the received TCP segment to determine if the received segment belongs to the fast path (step 302). The fast-path validation may include, without limitation, checksum validation, tuple lookup and identification to determine whether the received segment belongs to the fast path. The TCP segment is identified to be a fast-path segment if it passes a predefined TCP validation sequence. Accordingly, "fast path" as used throughout the specification and claims refers to handling and/or processing of a segment that has passed a predefined TCP validation sequence. This validation sequence is sufficient to identify a segment to be a valid TCP segment, which then permits the segment to undergo data processing (step 303), placement to consumer buffers (step 304) and delivery to a consumer without software (TCE) involvement (step 305).

If the segment does not pass fast-path validation, the segment is treated as a slow-path segment, and is temporarily stored in the reassembly buffer(s) 20 (step 306). Note that in some cases a valid TCP segment can fail a fast-validation sequence and be handled in slow path. Accordingly, "slow path" as used throughout the specification and claims refers to handling and/or processing of a segment that has not passed the predefined TCP validation sequence used for the fast path. The slow-path segment validation sequence may then be carried out (step 307), including without limitation, various extended checks that cover different cases not covered by the fast-path segment validation. The slow-path validation sequence is implemented by TCE 16. The TCE 16 may also perform reassembly of slow-path segments placed in the reassembly buffers, including without limitation, issuing a special command to the streamer 14 via CmdQ to process and place data (step 307A). The streamer 14 performs handling of data from the reassembly buffers (step 307B), e.g., requests fetching segments from the reassembly buffers, processes them, and places them in the destination buffers.

The streamer 14 may separate the TCP header and payload of each inbound TCP segment (both fast and slow paths), and pass the TCP header with additional information to the TCE 16 for further processing via the EvQ interface (step 308). The TCE 16 may implement the TCP protocol (step 309), including without limitation, congestion window management, timer management, RTTM (round trip time measurement) estimation, retransmit management, etc. Implementation of the TCP protocol may be carried out asynchronously with the data processing performed by streamer 14, and does not affect/delay data placement and delivery on the fast path. Steps 307, 307A and 307B may be part of step 309.

Figure 4:
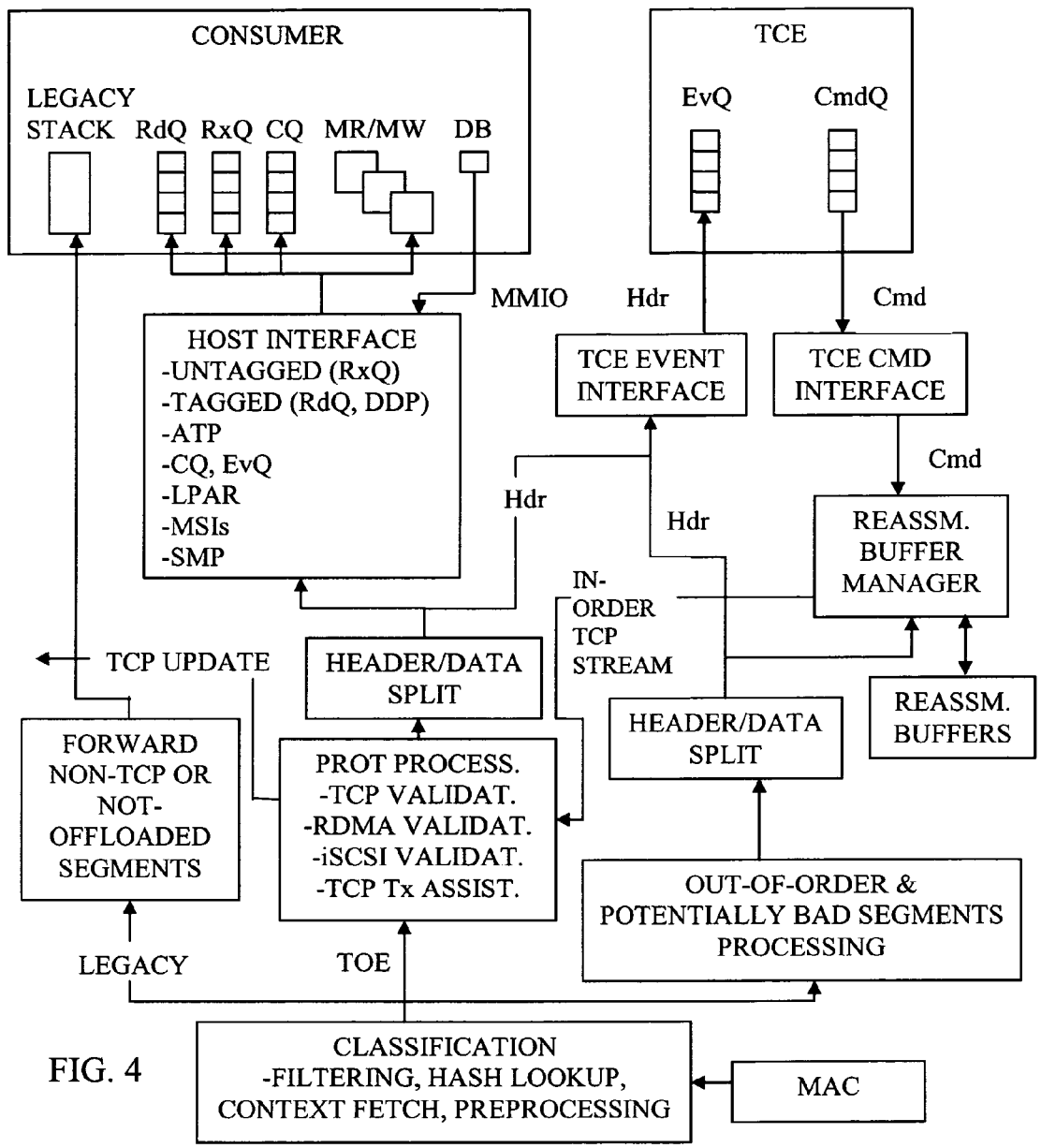
FIG. 4 is a more detailed flow diagram of receive flow in the network acceleration architecture, in accordance with an embodiment of the present invention.

The receive flow path is now described in detail with reference to FIG. 4. First, the streamer 14 receives an inbound TCP segment. The streamer 14 may perform basic validation and classification of the received TCP segment. This includes checksum validation, tuple lookup and identification to determine whether the received segment belongs to the fast path.

The classification operation may include several memory accesses to perform hash lookup and context fetch operations. Various caching mechanisms can be used to reduce the memory access delays and the amount of buffers needed to sustain incoming network traffic.

The TCP segment is identified to be a fast-path segment if it passes a predefined TCP validation sequence (described in detail below). Accordingly, "fast path" as used throughout the specification and claims refers to handling and/or processing of a segment that has passed a predefined TCP validation sequence. This validation sequence is sufficient to identify a segment to be a valid TCP segment, which then permits the segment to undergo postprocessing, placement to consumer buffers and delivery without software (TCE) involvement.

If the segment does not pass fast-path validation, the segment is treated as a slow-path segment, and is passed through the reassembly buffers 20. Note that in some cases a valid TCP segment can fail a fast-validation sequence and be handled in slow path. Accordingly, "slow path" as used throughout the specification and claims refers to handling and/or processing of a segment that has not passed the predefined TCP validation sequence used for the fast path.

The streamer 14 may separate the TCP header and payload of each inbound TCP segment (both fast and slow paths), and pass the TCP header with additional information to the TCE 16 for further processing via the EvQ interface.

The payload of the segment which passed fast-path validation may be processed by streamer 14. This may include processing of the RDMA/iSCSI and Socket ULP, depending on the connection type. The ULP processing may be carried out in any suitable manner; the details of the ULP processing are not within the scope of the invention. After processing ULPs, the payload may be placed in consumer buffers (depending on the ULP) and delivered to the consumer. Delivery options are described hereinbelow.

In the case of fast-path TCP segments, processing of the ULPs, data placement and delivery may be done before the TCE 16 processes the header of the segment (which was passed to the TCE 16 via the EvQ interface).

In case of slow-path TCP segments (which failed fast-path validation segments), the payload may be placed in the reassembly buffers 20, and the header may be passed to the TCE 16 via the EvQ interface for the further processing.

The streamer 14 is responsible for the reassembly buffers management, including without limitation, placement and fetch of the segment payload to the reassembly buffers 20, and dynamic or static allocation of reassembly buffer resources. Reassembly buffers 20 may be located in the system memory, although the network acceleration architecture of the invention does not prevent use of dedicated memory.

The TCE 16 may process the TCP header of each inbound TCP segment. It may implement various TCP algorithms, such as but not limited to, congestion control and window management, timer management, RTTM estimation, and others.

For the slow-path segments, the TCE 16 may also implement reassembly control and advanced segment validation. If the segment failed fast-path validation, the TCE 16 may perform extended validation sequence, covering various corner cases which are not covered by the fast-validation sequence.

When the TCE 16 completes reassembly of slow-path segments placed in the reassembly buffers, it puts a special command to the streamer 14 via CmdQ, which requests fetching segments from the reassembly buffers, processing them, and placing them in the destination buffers.

It is noted that the present invention allows reusing the same ULP processing logic to process data from the reassembly buffers, and avoids duplicating the same logic in the software stack.

In addition to handling the data segments on the fast and slow paths, the streamer 14 may also assist in acknowledgment processing and acknowledgment generation triggering, as is now described.

In accordance with a non-limiting embodiment of the present invention, the fast-path validation sequence may include the following steps or checks:
  Checksum validation
  Hash lookup which indicates that a segment belongs to an offloaded connection
  (Optionally, for connections that enable use of timestamps) Verify that timestamp is valid (SegTsVal≧ts_recent)
  Verify that SN is valid (at least some data is inside the window)
  Verify that RST flag is not set
  Verify that SYN flag is not set
  Verify that ACK flag is set
  Verify that Ack number is valid (SegAck≦SndNxt). The following is a non-limiting example of acknowledgment validation, including fast window update.

Inbound Ack may carry the receive window information of the remote side. SegAck and SegWnd may indicate the right edge of the window (remote RcvNxt) and the window size (remote RcvWnd), respectively. In addition, Inbound Ack may carry information about holes in the receive window (called the SACK option). The SACK option is not handled by streamer 14, and all TCP options together with TCP header are passed to TCE 16 for further processing.

Streamer 14 may perform a window update, e.g., an unambiguous send window (SndWnd) update (i.e., remote receive window update). A SndWnd update is unambiguous if the received packet is "newer" than the packet used for the last update, that is, it carries an increased sequence number and a newer ACK number. Otherwise (in ambiguous cases) streamer 14 may ignore window update information, and more detailed processing is done by TCE 16.

SndWnd update can be performed both by streamer 14 (in unambiguous cases) and by request from TCE 16. To resolve a potential race condition, the update AckSN is recorded together with window update, and each new update is done only with increasing AckSN.

This scheme of window update speeds up the process of window sliding, and therefore allows more efficient transmit process. TCE 16 is left with the responsibility to manage the remaining parameters of the transmit window (such as congestion window), and can override/affect the decision of streamer 14 (as in the ambiguous cases, wherein streamer 14 avoids updating the window based on information from the received segment).

The following is a non-limiting example of Ack Triggering and Delayed Ack Implementation.

With each TCP segment which passed fast-validation, streamer 14 may update acknowledgement information in the transmit portion of connection context (TS-echo and SN). This makes it possible to piggyback acknowledgement information while transmitting the data segments.

One non-limiting way of triggering acknowledgement is a combined triggering by the streamer 16 and the TCE 16. In this mode, streamer 14 may trigger acknowledgement for roughly each second full data segment. TCE 16 may perform delayed ack timer management, and trigger ack generation in case the timer expires. The streamer 14 may provide TCE 16 with the headers of the received TCP segments, and with an indication if the acknowledgement has been scheduled or not.

It is noted that although there may be a potential race problem, this can be handled by a simple indexing scheme, similar to that described hereinabove for acknowledgment validation and fast window update. The indexing scheme may reduce delays in ack generation and in the latency of overall post-to-completion operation, without adding complexity to the hardware implementation.

In another non-limiting embodiment, triggering acknowledgement may be accomplished solely by the TCE 16. That is, the streamer 14 does not make any triggering acknowledgement decision, and simply generates acks upon a command from the TCE 16. This embodiment eliminates the potential race problem mentioned above. Although it adds latency to the acknowledgement generation, it makes controlling the rate of inbound traffic possible for the given connection—if TCE 16 is a bottleneck, it slows down the ack generation rate, and thus slows down the rate of the new packet arrival, thereby creating a self-controlled and balanced system.

In any event, ack generation requests are placed to the dedicated ack generation queue, and do not go through the ready queue mechanism used for the data transmission. There is no attempt to perform ack piggybacking in the case of immediate or non-delayed acks. Ack generation is a relatively fast operation, which does not require fetching any WQE or data from the host memory, and therefore can be quite easily and quickly handled by streamer 14.

As mentioned above, the payload of the segment which passed fast-path validation may be processed by streamer 14. After processing ULPs, the payload may be placed in consumer buffers (depending on the ULP) and delivered to the consumer. Some delivery options are now described.

In a first delivery option, for delivery of segments received in the fast path, it is assumed that a segment which passed fast validation can be directly placed to the consumer memory. Under this assumption, the delivery is reported by streamer 14 without any involvement by TCE 16.

Another option is to delay delivery until a special command is received from TCE 16. This option makes it possible for the TCE 16 to have more control over the delivery process, and delivery occurs only after the TCE 16 has received the header of the packet.

In a second delivery option, for delivery of segments received in the slow path (via the reassembly buffers 20), segment headers have already been processed and validated by the TCE 16. Accordingly, delivery of such segments may follow software validation, and can safely follow data placement.

For message oriented ULPs, delivery may be carried out on a per message basis, wherein message boundaries are identified by the wire protocol. Sockets are a stream-based ULP with no message boundaries identified on the wire. During implementation of the socket ULP, a decision must be made when to report completion of the current receive WQE. One way would be to report WQE completion per packet base, but such an approach may lead to poor utilization of consumer buffers and may lead to performance degradation.

In a non-limiting embodiment of the invention, instead of reporting WQE completion per packet base, the streamer 14 may report delivery of full WQEs and may notify the TCE 16 of WQE delivery and placement of data to the new WQE. The TCE 16 may keep track of non-reported WQEs and maintains a timer. When the timer expires, it requests the streamer 14 to deliver the current WQE. To avoid race problems, some sort of indexing can be used (e.g. WQE indexing).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for data reception, comprising:
receiving from a communication network a Transport Control Protocol (TCP) segment comprising TCP packets containing at least a TCP header;
communicating with a consumer application running on a host CPU having a host memory by exchanging, via a host interface, with the consumer application work queue elements via send and receive queues and completion queue elements via a completion queue; and
processing the TCP packets by:
performing TCP control operations on the TCP header using a protocol processor;
performing TCP data movement operations, responsively to the TCP header, using an acceleration engine that operates simultaneously and asynchronously with respect to the protocol processor; and
communicating between the acceleration engine and the protocol processor using an asynchronous queue interface, which is separate from the host interface and which comprises a command queue for conveying commands from the protocol processor to the acceleration engine and an event queue for reporting events from the acceleration engine to the protocol processor,
wherein the TCP data movement operations performed by the acceleration engine comprise placement of data from one or more of the packets, via the host interface, in a consumer buffer in the host memory, and
wherein the acceleration engine passes the TCP header to the protocol processor via the asynchronous queue interface and places the data in the consumer buffer without waiting for the protocol processor to process the TCP header.

2. The method according to claim 1, and comprising applying a fast-path validation process to the TCP segment using the acceleration engine in accordance with a predefined TCP validation sequence.

3. The method according to claim 2, wherein applying the fast-path validation process comprises treating the TCP segment as a slow-path segment and temporarily storing the TCP segment in a reassembly buffer responsively to the TCP segment failing the fast-path validation process.

4. The method according to claim 3, and comprising placing content of the reassembly buffer in a consumer buffer by the acceleration engine.

5. The method according to claim 2, and comprising applying to the TCP segment a slow-path validation process by the protocol processor, wherein the slow-path validation process comprises at least one case that is not covered by the fast-path validation process.

6. The method according to claim 2, wherein the fast-path validation process comprises at least one validation test selected from a group of tests consisting of a checksum validation, a tuple lookup, a hash lookup indicating that the segment belongs to an offloaded connection, a timestamp validity verification, a segment sequence number validity verification, a reset flag verification, a synchronization flag verification, an acknowledgement flag verification, and an acknowledgement number validity verification.

7. The method according to claim 2, wherein performing the data movement operations comprises processing a payload of the TCP segment responsively to the TCP segment passing the fast-path validation process.

8. The method according to claim 7, wherein processing the payload comprises processing at least one element selected from a group of elements consisting of a Remote Direct Memory Access/Internet Small Computer Interface (RDMA/iSCSI) and a Socket Upper-Layer Protocol (ULP).

9. The method according to claim 7, wherein processing the payload comprises placing the payload in a consumer buffer and delivering the payload to the consumer application.

10. The method according to claim 2, and comprising performing acknowledgment processing of the TCP segment using the acceleration engine.

11. The method according to claim 10, wherein performing the acknowledgment processing comprises updating acknowledgement information in a transmit portion of a connection context.

12. The method according to claim 11, wherein updating the acknowledgement information comprises piggybacking the acknowledgement information while transmitting data segments.

13. The method according to claim 2, wherein applying the TCP control operations comprises triggering acknowledgment of the TCP segment by the protocol processor.

14. The method according to claim 2, and comprising triggering acknowledgment of the TCP segment by the acceleration engine and the protocol processor.

15. The method according to claim 2, wherein performing the data movement operations comprises performing a fast window update by the acceleration engine.

16. The method according to claim 15, wherein at least one of the TCP packets carries a higher sequence number and a newer ACK number with respect to another packet used for a previous update, and wherein performing the fast window update comprises performing an unambiguous send window update.

17. The method according to claim 15, wherein, when a given TCP packet in the TCP segment does not carry a higher sequence number and a newer ACK number with respect to another packet used for a previous update, ignoring window update information by the acceleration engine and applying further processing to the given packet by the protocol processor.

* * * * *